E. I. DODDS.
STAY BOLT.
APPLICATION FILED APR. 9, 1913.
1,121,173.
Patented Dec. 15, 1914.
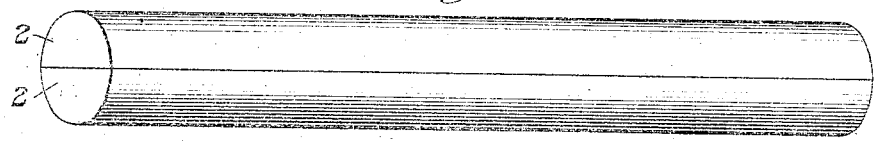
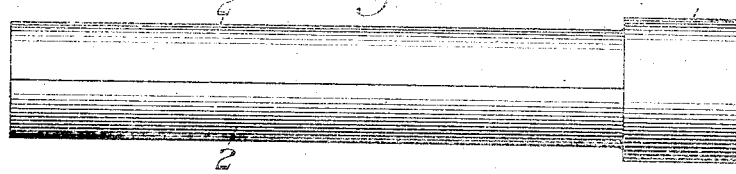
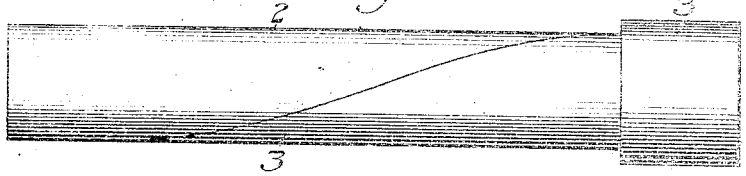
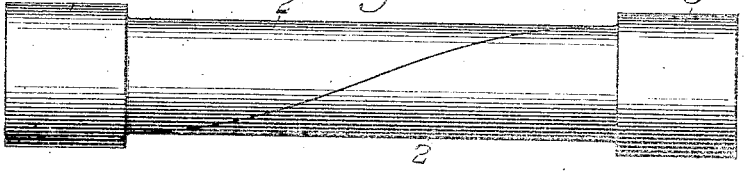
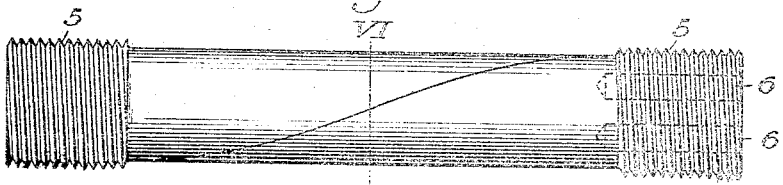
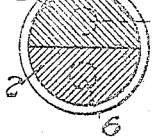
WITNESSES
INVENTOR

UNITED STATES PATENT OFFICE.

ETHAN I. DODDS, OF CENTRAL VALLEY, NEW YORK, ASSIGNOR TO KERNER MANUFACTURING COMPANY, OF PITTSBURGH, PENNSYLVANIA, A CORPORATION OF PENNSYLVANIA.

STAY-BOLT.

1,121,173.  Specification of Letters Patent.  Patented Dec. 15, 1914.

Application filed April 9, 1913. Serial No. 759,915.

*To all whom it may concern:*

Be it known that I, ETHAN I. DODDS, a citizen of the United States, and a resident of Central Valley, Orange county, New York, have invented a new and useful Improvement in Stay-Bolts, of which the following is a full, clear, and exact description, reference being had to the accompanying drawings, forming part of this specification, in which—

Figure 1 is a perspective view of the two bars from which the bolt is formed. Fig. 2 is a side elevation showing the bars welded and upset at one end. Fig. 3 is a view similar to Fig. 2 showing the blank after twisting. Fig. 4 is a view similar to Fig. 3 showing the blank after the other end is upset and welded and the head portions milled or machined. Fig. 5 is a side elevation of the finished article. Fig. 6 is a cross section of the finished article on the line VI—VI of Fig. 5.

My invention relates to the class of stay bolts, and is designed to provide an improved article of this character which shall perform functions heretofore not attained in devices of this kind.

In making my improved stay bolt, I preferably proceed as follows: I take less than four preferably rolled bars of preferably stay bolt iron and pile them together, and then locally heat one end portion which is to be welded. These bars when piled together give the desired cross section, and are locally heated in the pile to approximately a sweating heat, when these ends begin to unite. The end portion thus heated is localized so that the intermediate portion of the bar between the heads will not be welded together. The pile is then withdrawn and the heated end is simultaneously upset and welded by die action. I preferably use two bars 2, 2, of half-round section, which are piled together in the form shown in Fig. 1. Fig. 2 shows the blank after one end has been upset and welded to form the enlarged head 3. This head is upset in dies, the cavity of which is larger than the head desired, preferably at least by one-sixteenth of an inch. This is to compensate for the losses in scale when welding together a plurality of separate bars. I then twist the bar portions projecting from the welded head through an angle of at least 90 degrees. I have found that it is necessary to twist the bars through at least an angle of 90 degrees in order to give the stay bolt the desired tensile capacity and resistance against unwinding under tensile strains to which the stay bolt is subjected in service. After this twisting operation, the other end portions of the bars are locally heated in the same manner as the first end, and are simultaneously upset and welded in the same manner as the other head 3, which is also of larger diameter than that finally desired. The heads are then turned off or milled on their cylindrical surfaces to give the desired diameter. The heads are then provided with screw threads, and the threads on one head are a continuation of those on the other head. That is, the threads on both heads are the same as though the bolt had been made of the same diameter throughout and continuously threaded from one end to the other, and the intermediate end portion of the bar then turned off to remove the threads. The threaded heads are indicated at 5 in Fig. 5. Tell-tale holes 6 are then drilled longitudinally through one or both heads into each connecting bar section.

The advantages of my invention lie in the flexibility of the bolt to resist the strains on the sheets, while at the same time the bolt gives the necessary resistance to compression, tension and torsion strains, and can be inserted as easily as the ordinary bolt.

In service the bolt is subjected to vibrations and gyratory movements due to the movements of the two plates or sheets on the boiler which the bolts connect. Owing to the twisting of the bars through at least 90 degrees, the points of greatest bending stress will be shifted through these bars instead of being localized near one end of the bolt. Consequently the life of the bolt is greatly extended. Owing to the twisting of the bars through an angle of at least 90 degrees, the bar possesses the necessary resistance to tensile strains and also to torsion strains, both in applying the bolt and in service.

I have found that if four or more connecting bars are used between the heads, the bolt will not give the desired resistance to the strains to which it is subjected, and is also difficult to insert since after one head has been partly screwed into place and the screw threads on the other head begin to engage the other sheet, the torsion in applying will twist the bolt slightly and lock it, so that it cannot be properly inserted. With four or more connecting bars, furthermore, difficulty would be experienced in threading, on account of the liability of the bar to twist and distort the threads, so that the threads on one head would not properly aline with the threads on the other head as is necessary in order to insert the bolt. Furthermore, after these bolts are inserted the slightly projecting head portions thereof are peened over or headed slightly, to retain them in place and make the joints tight, and this action would distort and injure a bolt having four or more connecting bars, since the size of the bolt is limited to certain established standards, and the cross section of the bars cannot, therefore, be increased. By using less than four bars, the size of the bars is sufficient to give the desired resistance to strains both in making, applying and in use, and at the same time the bars are sufficiently large to properly contain the telltale holes. The size of the telltale holes is fixed by government standards, and consequently the bars must be of proper size to contain these holes, and also to meet certain requirements under test. These requirements are all met by my improved stay bolt, wherein two bars are used. Furthermore, my stay bolt will respond to the hammer test, giving the proper sound to indicate whether or not one of the bars has been broken, to even a greater degree than will an ordinary rigid stay bolt. The boiler can therefore be more easily, quickly and accurately tested in this manner. Furthermore, by using two or three bars, these bars will remain together in piled form during heating, where it would be more difficult to hold a greater number together during heating and inserting into the upsetting and welding dies.

It will be noted that the outer surface of the connecting bars is scale covered, thus giving a much better surface for resisting the action of water than where a machined surface is exposed. The natural skin portion formed on the bars during their manufacture is not cut away or disturbed, and consequently the stay bolt is stronger on this account.

The bars may be made of any desired shape, but should be less than four in number, and should have flat engaging surfaces where they contact with each other.

By the words "approximately semicylindrical" in my claims, I intend to cover any bar having a shape approximating the semicylindrical form. For example, the exterior surface of the bar may be made up of a succession of plane or curved surfaces which may be of any number, provided they form an approximate semicylinder. For instance, the bar may be half hexagon or half octagon in shape; or the succeeding exterior faces may be slightly concaved. All such variations are intended to be covered in my claims.

Within the scope of my broader claims, the bars may be twisted either before or after either or both heads are formed. The upsetting may be carried out either before or after welding the ends, and other changes may be made without departing from my invention.

By the word "stay bolt" in my claims, I do not intend to limit the use of my bolt to boilers, but to cover its use in any desired connection where the bolt is subjected to vibrations.

I do not claim herein the process of making the bolt, as this will form the subject matter of another application.

The present application is a continuation, in part, of my application Serial No. 713,419, filed August 6, 1912.

I claim:

1. A stay bolt having solid integral end heads and a body portion, the latter comprising two separate members integral with said heads and extending from head to head, said members having adjacent faces which extend the full diameter of the body members and contact with each other, the body members being twisted at least 90 degrees to give the bolt flexibility to resist strains due to relative movements of the plates which it connects while retaining sufficient resistance for other strains, the heads being so threaded as to allow engagement with the threaded portions of successive separate plates which the stay bolt is to connect; substantially as described.

2. A stay bolt comprising two separate bars, each of approximately semi-cylindrical form and having a flat engaging surface, the two symmetrical bars forming a cylinder, said bars being twisted at least 90° to give the bolt flexibility to resist strains due to relative lateral movements of the plates which it connects while retaining sufficient resistance for other strains, said bars having solid integral end heads so threaded as to allow engagement with the threaded holes of successive separated plates which the stay bolt is to connect; substantially as described.

3. A stay bolt comprising two separate bars, each of approximately semi-cylindrical form and having a flat engaging surface, the two symmetrical bars forming a cylinder, said bars being twisted at least 90° to give the bolt flexibility to resist strains due to relative lateral movements of the plates which it connects while retaining sufficient resistance for other strains, said bars having solid integral end heads so threaded as to allow engagement with the threaded holes of successive separated plates which the stay bolt is to connect, at least one of the heads having a tell-tale hole extending into one of the bars; substantially as described.

In testimony whereof, I have hereunto set my hand.

ETHAN I. DODDS.

Witnesses:
 JESSE B. HELLER,
 H. M. CORWIN.